United States Patent
Fisher

(10) Patent No.: US 8,443,714 B2
(45) Date of Patent: May 21, 2013

(54) VIBRATION/SHOCK RESISTANT STUD HOUSING

(75) Inventor: Albert D. Fisher, Kansas City, MO (US)

(73) Assignee: Haldex Brake Corporation, Kansas City, MO (US)

(*) Notice: Subject to any disclaimer, the term of this patent is extended or adjusted under 35 U.S.C. 154(b) by 728 days.

(21) Appl. No.: 12/633,082

(22) Filed: Dec. 8, 2009

(65) Prior Publication Data

US 2011/0132189 A1 Jun. 9, 2011

(51) Int. Cl.
*F16J 10/04* (2006.01)
*F01B 7/00* (2006.01)

(52) U.S. Cl.
USPC .............................................. 92/169.2; 92/63

(58) Field of Classification Search
USPC .............................. 92/63, 64, 169.2; 248/562
See application file for complete search history.

(56) References Cited

U.S. PATENT DOCUMENTS

| | | | |
|---|---|---|---|
| 3,107,583 A * | 10/1963 | Woodward | 92/63 |
| 3,495,503 A * | 2/1970 | Gummer et al. | 92/63 |
| 3,509,795 A * | 5/1970 | Woodward | 92/63 |
| 4,409,460 A | 10/1983 | Nishii et al. | |
| 4,725,029 A | 2/1988 | Herve | |
| 5,016,523 A | 5/1991 | Bowyer | |
| 5,072,607 A | 12/1991 | Kaneko | |
| 5,158,006 A | 10/1992 | Gotoh et al. | |
| 5,784,946 A | 7/1998 | Malosh et al. | |
| 6,719,477 B2 | 4/2004 | Vermoesen et al. | |

* cited by examiner

*Primary Examiner* — Michael Leslie
(74) *Attorney, Agent, or Firm* — St. Onge Steward Johnston & Reens LLC

(57) ABSTRACT

A brake stud housing assembly and method of construction of such assembly for vehicles that exhibits increased shock resistance and vibration reduction capability, allowing for increased durability of a brake housing assembly. The housing assembly includes a vibration dampening layer having an adhesive material that provides a permanent connection between the housing shell and reinforcing plate, which transfers both tensile and compressive loading forces between the housing shell and reinforcing plate in order to reduce vibration and stress.

17 Claims, 4 Drawing Sheets

VIBRATION/SHOCK RESISTANT STUD HOUSING

FIELD OF THE INVENTION

The invention relates to a brake stud housing assembly for vehicles, more particularly to a brake stud housing assembly that exhibits increased shock resistance and vibration reduction capability, allowing for increased durability of a brake housing assembly.

BACKGROUND OF THE INVENTION

Automotive vehicles require brakes in order to apply a force of friction against the road. Vehicles, for example heavy duty vehicles such as trucks, trailers, campers, buses, and other such heavy duty vehicles, require a substantial force to stop the vehicle from moving or to reduce the speed of the vehicle.

Rather than use traditional brake systems, heavy duty vehicles use air brake systems, the air brakes having a housing design able to support a force great enough to reduce the speed of a heavy duty vehicle.

The prior art has deployed various housing designs that are able to accommodate such a force exerted upon the housing by an actuator or push-rod. However, prior art designs suffer from limitations as the prior art designs do not sufficiently accommodate for the shock and vibration stress exerted upon the housing.

Shock and vibration stress in combination with the typical stress concentrations are the primary reasons for material failure in such stud housing assemblies for heavy duty vehicle brake actuators. Thus, it is desirable to develop a system that can reduce the amount of shock and vibration in stud housing assemblies. It is further desirable to develop a system that dampens the shock and vibrations in the housing by applying a flexible adhesive material for load transfer in the housing assembly.

Prior art housings designs attempt to reduce stress and vibration, however, these designs have limited capability as such designs do not effectively reduce shock and vibration stress, and do not use a flexible adhesive material to assist with load transfer.

Prior art designs involve stamped metal stud housing assemblies and cast metal housing assemblies.

Cast metal housing assemblies have studs cast into the housing or attached by threading into or through the casting.

However, these cast metal housing assemblies, while being robust and typically not as prone to vibration and shock damage as stud type housings, are very heavy. The weight of the cast type housings make them uneconomical and inefficient for use in heavy duty vehicles. In industry, cast type housings are not widely used.

Stamped metal stud housings designs found in the prior art include stamped metal stud housing assemblies having studs rigidly attached directly to the housing shell by welding, swaging, and/or riveting. These designs may additionally have one or more reinforcing plates to limit vibration and stress.

U.S. Pat. No. 5,784,946 to Malosh et al. teach a housing with a central opening having a metal plate and a housing, with studs connecting the metal plate to the housing, and a foam membrane bonded thereto with an adhesive layer to dampen sound.

While the foam membrane and adhesive layer of Malosh et al. act to dampen sound, Malosh et al. do not teach a flexible adhesive material that reduces shock and vibration, while providing a permanent attachment for the reinforcing plate to the housing. Additionally, Malosh et al. do not teach load transfer for both compressive and tensile forces.

U.S. Pat. No. 4,409,460 to Nishii et al. teach reinforcing a portion of a housing with an annular plate secured to the housing via bolts and an insulating layer. However, Nishii et al. do not teach a flexible adhesive material attached to the stud housing shell to reduce shock and vibration, while providing a permanent attachment of the reinforcing plate to the housing. Nishii et al. also do not teach load transfer for both compressive and tensile forces.

U.S. Pat. No. 5,072,607 to Kaneko teaches a housing with a reinforcement plate, the reinforcement plate clamped between the shell and mounting plate to improve vibration/insulating properties. However, Kaneko also does not teach a flexible adhesive material attached to the stud housing shell to reduce shock and vibration, while providing a permanent attachment of the reinforcing plate to the housing. Kaneko also does not teach load transfer for both compressive and tensile forces.

The prior art fails to provide the advantage of a flexible adhesive material, which provides a permanent attachment of the reinforcing plate to the housing. The prior art additionally fails to teach load transfer for both compressive and tensile forces.

Therefore, it is desirable to provide a vibration and shock resistant stud housing design for stud mounted brake actuators that has a flexible adhesive material set between the reinforcing plate and housing shell. It is further desirable to provide a stud housing design which incorporates threaded mounting studs which are rigidly attached to a separate reinforcing plate and subsequently attached to the stud housing shell with a flexible high strength adhesive material. It is further desirable that the flexible adhesive material consist of polymeric tape with high strength pressure sensitive adhesive on both sides, which is applied between the reinforcing plate and housing shell. It is further desirable that a permanent attachment is formed between the reinforcing plate and the housing shell that helps to avoid stress concentrations in the housing shell. It is further desirable that the stud housing design teach load transfer for both compressive and tensile forces.

SUMMARY OF THE INVENTION

Accordingly, it is an object of the present invention to provide a vibration and shock resistant stud housing design for stud mounted brake actuators used on heavy duty vehicles.

It is a further object of the present invention to provide a stud housing design having vibration and shock resistant capabilities.

It is a further object of the present invention to provide a stud housing design having a flexible adhesive material set between the reinforcing plate and housing shell. The flexible adhesive material may consist of polymeric tape with high strength pressure sensitive adhesive on both sides.

The flexible adhesive material may also be other thin vibration dampening materials with adhesive, a heavy bodied adhesive caulk or a hot melt type material.

It is a further object of the present invention to apply the flexible adhesive material between the reinforcing plate and housing shell.

It is a further object of the present invention for the flexible adhesive material to provide a thin shock absorbing or insulating layer between the metal components which helps to dissipate or dampen shock and vibration stress.

It is a further object of the present invention to provide threaded mounting studs which are rigidly attached to a reinforcing plate and stud housing shell.

It is further object of the present invention to provide a permanent attachment between the reinforcing plate and the housing shell. It is a further object of the present invention for the flexible adhesive material to provide such attachment.

It is a further object of the present invention to avoid stress concentrations in the housing shell which are unavoidable with rigid attachments such as welding, bolting, riveting, etc.

It is a further object of the present invention to allow for load transfer for both compressive and tensile forces.

These and other objectives are achieved by providing a brake housing comprising a shell, a reinforcing plate, a layer located between the shell and the reinforcing plate, and an attachment between the shell and reinforcing plate for a load transfer, the attachment provided by the layer. The layer may be made of a vibration dampening material.

The load transfer associated with the attachment may be associated with both tensile and compressive load transfer.

Upon flexing of the shell, the layer may transfer a portion of the load from the shell to the reinforcing plate.

The brake housing may further comprise mounting studs passing through the shell and reinforcing plate, rigidly attaching the shell to the reinforcing plate.

The layer providing the attachment between the housing shell and reinforcing plate may comprise an insulating layer and an adhesive. The adhesive may be present on both sides of the insulating layer.

The adhesive may be a heavy bodied adhesive caulk or hot melt type material. The adhesive may also be a high strength pressure adhesive.

The insulating layer may be made from a polymeric tape, or other such insulating material known in the art.

The adhesive may provide a permanent attachment between the reinforcing plate and the housing shell.

Additionally, the present invention provides a vibration dampening system for a brake housing comprising an insulating layer, and at least one adhesive, the adhesive connecting the insulating layer to a brake housing shell and connecting the insulating layer to a reinforcing plate located adjacent to the brake housing shell.

The adhesive of the vibration dampening system may be present on both sides of the insulating layer.

The insulating layer may be made from a polymeric tape, while the adhesive may be a heavy bodied adhesive caulk or hot melt type material. Other such adhesives and insulating layers known in the art may also be used.

The present invention also provides a method for manufacturing a brake housing having vibration dampening capabilities comprising the steps of providing a shell, a reinforcing plate, and a layer; placing the layer between the shell and the reinforcing plate; and attaching the shell to the reinforcing plate for load transfer via the layer.

The step of attaching may result in a permanent attachment between the shell and reinforcing plate.

The load transfer associated with the vibration dampening layer may be associated with both tensile and compressive load transfer.

Upon flexing of the housing shell, the vibration dampening layer may transfer a portion of the load from the housing shell to the reinforcing plate.

The method may further comprise the step of providing mounting studs which pass through the housing shell and reinforcing plate to rigidly attach the housing shell to the reinforcing plate.

The vibration dampening layer described in the method may comprise an insulating layer and at least one adhesive. The adhesive may be present on both sides of the insulating layer.

The vibration dampening layer may function by providing the mechanism or attachment to transfer both tensile and compressive loading between the housing shell and the reinforcing plate. The vibration dampening layer with adhesive may distribute and dampen the stress from both compressive and tensile reactions, whereas a separate insulating layer without adhesive bond will only work in compression. When the housing shell flexes under load in a way that tends to separate it from the reinforcing plate (the tensile force), the vibration dampening layer will transfer some of the stress so the reinforcing plate can share the load. An insulating layer without adhesive qualities would do nothing in this situation.

In standard brake actuator applications, such tensile and compressive loading will cycle from one side of the part to the other under typical vibration (oscillating) or impact acceleration input. The vibration dampening layer assists the housing to reduce the stress and vibrations from such oscillation, which would typically lead to material failure in such stud housing assemblies. The present invention helps deter this material failure.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1A is a detailed view of the vibration layer set between the reinforcing plate and housing shell shown in 1A of FIG. 1;

DETAILED DESCRIPTION OF THE INVENTION

Figure 1:
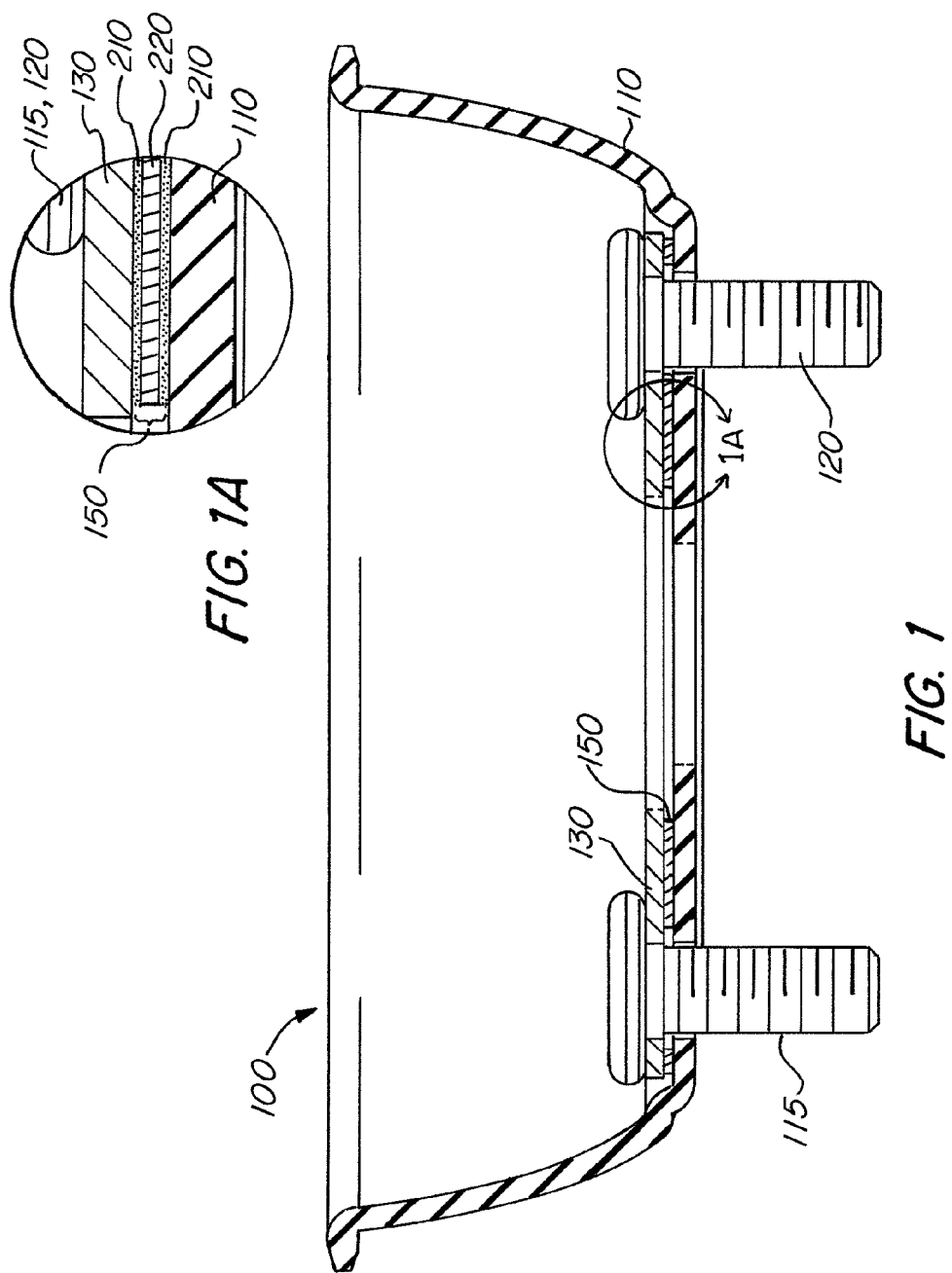
FIG. 1 is a side view of the brake housing assembly showing the housing shell, mounting studs, reinforcing plate and vibration layer.

FIG. 1 illustrates a brake housing assembly 100 having housing shell 110, mounting studs 115 and 120, reinforcing plate 130, and vibration dampening layer 150. Mounting studs 115 and 120 are shown passing through reinforcing plate 130, vibration dampening layer 150, and housing shell 110. This allows for the mounting studs 115 and 120 to rigidly attach housing shell 110 to reinforcing plate 130. Mounting studs 115 and 120 may be threaded studs.

The vibration dampening layer 150 assists with the load transfer process of the housing 100. The load transfer associated with the housing 100 is associated with both tensile and compressive load transfer. Upon flexing of the shell, vibration dampening layer 150 transfers a portion of the load from housing shell 110 to reinforcing plate 130.

Vibration dampening layer 150 works by providing the mechanism or attachment to transfer both tensile and compressive loading between housing shell 110 and reinforcing plate 130. This reduces vibration and stress in housing shell 110, the vibration and stress being sources of material failure of prior art housing assemblies.

Vibration dampening layer 150 may consist of an elastic damping layer of tape, caulk or hot melt flexible material. Vibration dampening layer 150 can distribute and dampen the stress from both compressive and tensile forces, whereas a separate insulating layer without adhesive bond will only work in compression. When housing 110 flexes under load in a way that tends to separate it from reinforcing plate 130 (the tensile force), vibration dampening layer 150 will transfer some of the stress so reinforcing plate 130 can share the load. An insulating layer without adhesive or attachment qualities would do nothing in this situation.

In FIG. 1A, a detailed view of element 1A of FIG. 1 is shown. This detailed view shows vibration dampening layer 150 set between reinforcing plate 130 and housing shell 110. Vibration dampening layer 150 may be composed of an insulating layer 220 and adhesive layer(s) 210. The adhesive layer(s) may be present on both sides of insulating layer 220, such as to provide a permanent attachment between reinforcing plate 130 and housing shell 110.

Adhesive layer(s) 210 may be made from a heavy bodied adhesive caulk or hot melt type material. Insulating layer 220 may be made from a polymeric tape.

Other such adhesives that may be used include: anaerobic adhesives, Cyanoacrylates, Toughened Acrylics, Epoxies, Polyurethanes, Silicones, Phenolics, Polyimides, Plastisols, Polyvinyl Acetate, Pressure-Sensitive Adhesives, and other such adhesives known in the art.

Other such insulating layers may be industrial tape, double-sided industrial tape, Acrylonitrile, butadiene, styrene, Acetate, Acrylic, Beryllium Oxide, Ceramic, Delrin, Epoxy/Fiberglass, Kapton, Melamine, Neoprene, Rubber, Nomex, Nylon, Polyester, Phenolics, Polystyrene, PVC, Silicone Rubber, Thermoplastics, Electrical Insulating Papers, Silicone, Vinyl, Laminates, and other such insulating layers known in the art.

Figure 2:
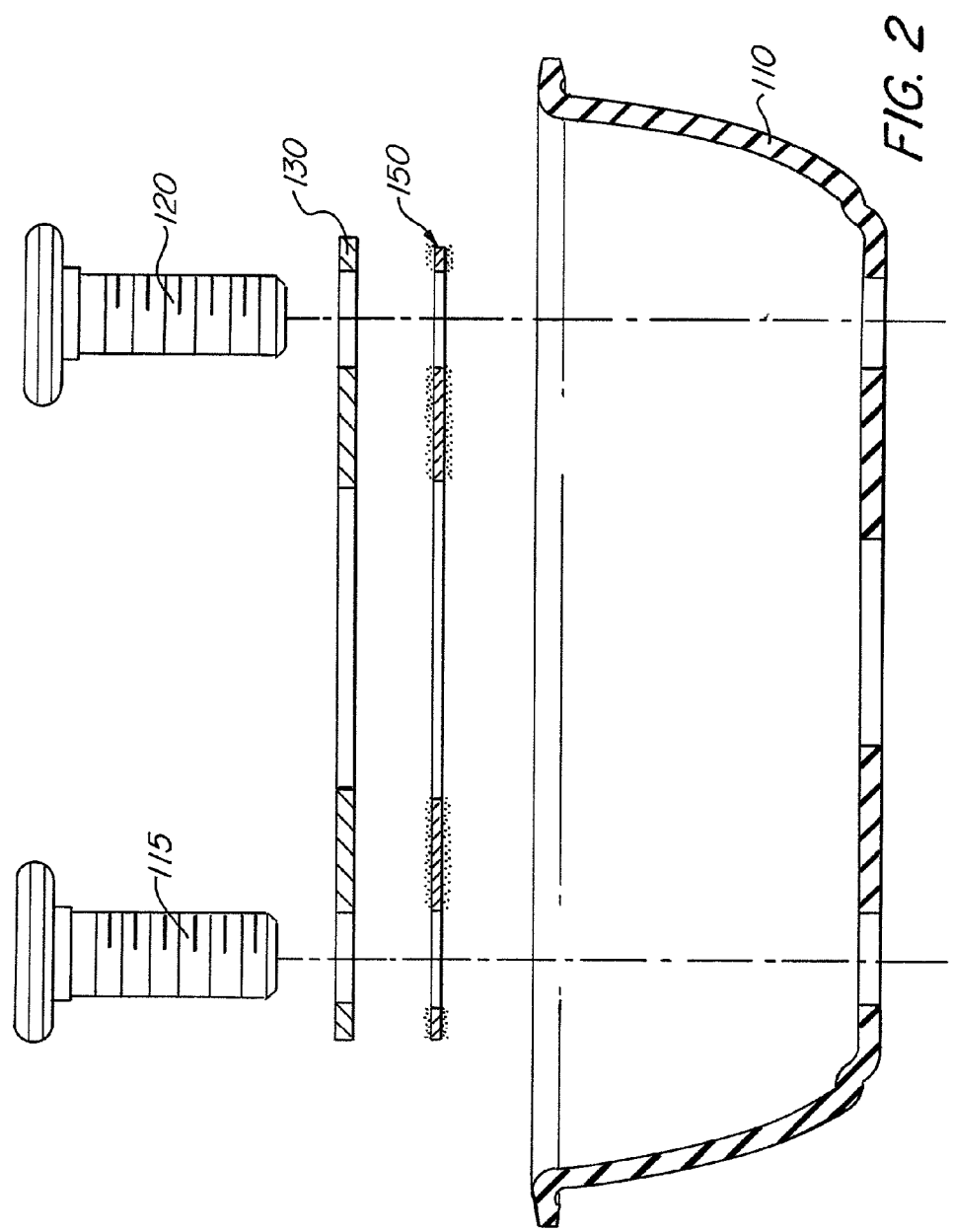
FIG. 2 is an exploded view of the brake housing assembly.

FIG. 2 shows an exploded view of the stud housing assembly 100 showing mounting studs 115 and 120, reinforcing plate 130, vibration dampening layer 150, and housing shell 110. The construction of the assembly is shown whereby mounting studs 115 and 120 pass through reinforcing plate 130, vibration dampening layer 150 and housing shell 110.

Figure 3:
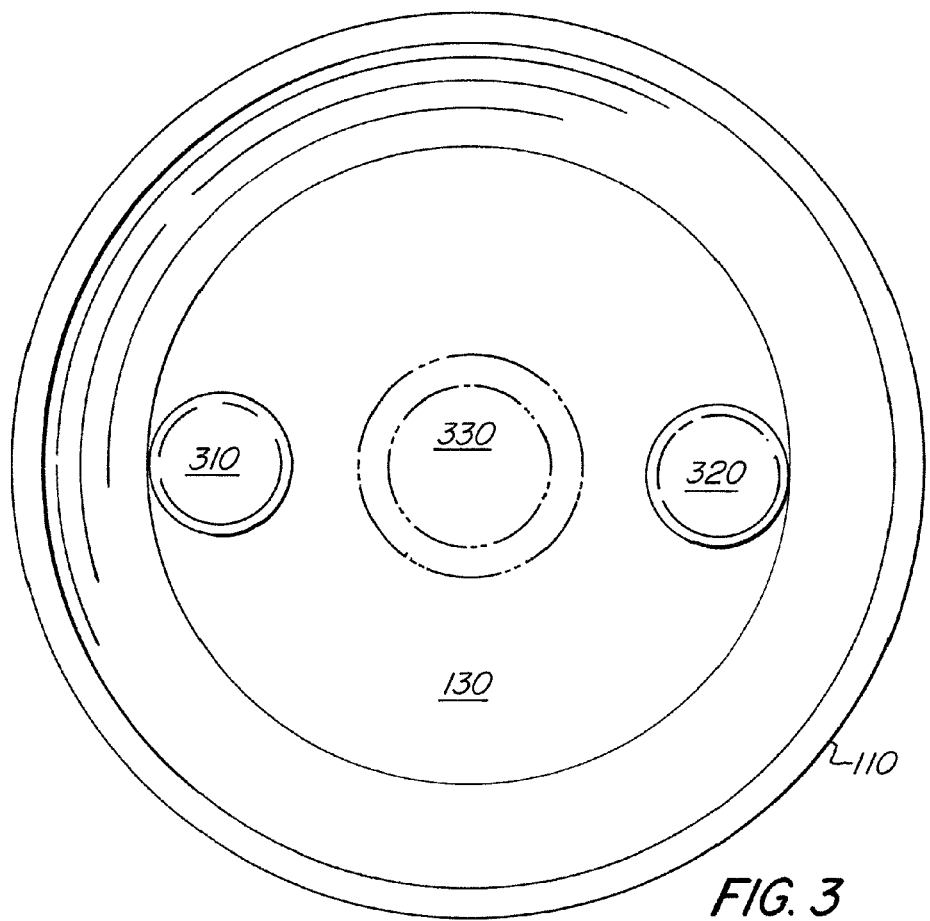
FIG. 3 is a top side view of the housing shell and reinforcing plate set on top of the housing shell.

FIG. 3 shows a top view of stud housing assembly 100. Here, the housing shell 110 is shown having holes 310 and 320 to accommodate mounting studs 115 and 120. Additionally, hole 330 is shown if housing shell 110 requires a hole for a pushrod or actuator (not shown) to pass through. Reinforcing plate 130 is shown set on top of housing shell 110 in FIG. 3.

Figure 4:
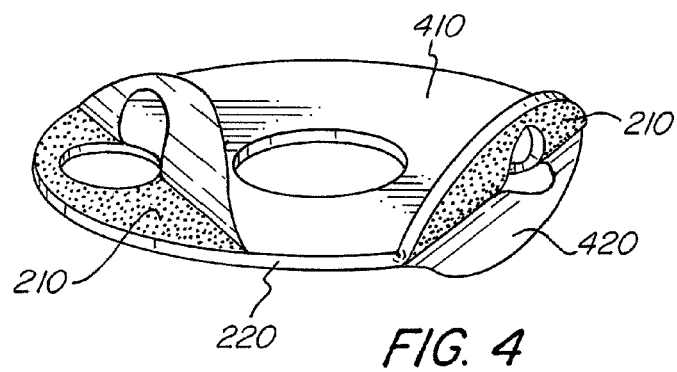
FIG. 4 is a exploded view of the flexible adhesive layer.

FIG. 4 shows an exploded view of vibration dampening layer 150 shown in FIG. 1A. Here, adhesive layer(s) 210 are shown, as well as thin layers 410 and 420. When vibration dampening layer 150 is set between housing shell 110 and reinforcing plate 130, thin layers 410 and 420 can be peeled off. This will then allow vibration dampening layer 150 to be set between housing shell 110 and reinforcing plate 130.

Figure 5:
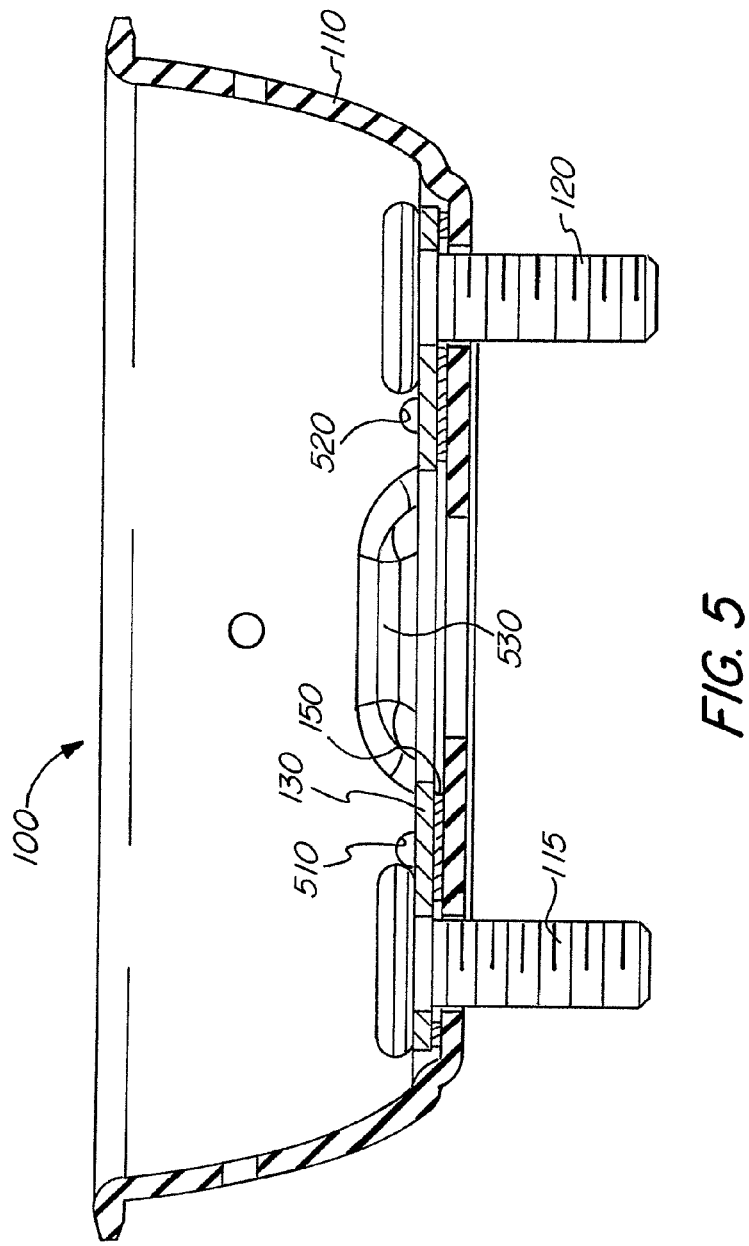
FIG. 5 is a side view of the brake housing assembly of FIG. 1.

FIG. 5 shows a side view of the brake housing assembly of FIG. 1 having lateral holders 510 and 520 for assisting mounting studs 115 and 120 to remain in place. Additionally, FIG. 5 shows element 530 which may connect to a pushrod or actuator (not shown) for providing a tensile and compressive load upon housing assembly 100.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A brake housing comprising:
   a housing shell;
   a reinforcing plate;
   an insulating layer and adhesive located between the housing shell and the reinforcing plate, the insulating layer and the adhesive providing an attachment between the housing shell and the reinforcing plate for a load transfer; and
   mounting studs passing through the shell and reinforcing plate, rigidly attaching the housing shell to the reinforcing plate.

2. The brake housing of claim 1, wherein the load transfer associated with the attachment is associated with both tensile and compressive load transfer.

3. The brake housing of claim 1, wherein upon flexing of the housing shell, the layer transfers a portion of the load from the housing shell to the reinforcing plate.

4. The brake housing of claim 1, wherein the adhesive is present on both sides of the insulating layer.

5. The brake housing of claim 1, wherein the adhesive is a heavy bodied adhesive caulk or hot melt type material.

6. The brake housing of claim 1, wherein the insulating layer is made from a polymeric tape.

7. The brake housing of claim 1, wherein the adhesive provides a permanent attachment between the reinforcing plate and the housing shell.

8. The brake housing of claim 1, wherein the adhesive is a high strength pressure adhesive.

9. The brake housing of claim 1, wherein the layer is made of vibration dampening material.

10. A vibration dampening system for a brake housing comprising:
    an insulating layer, and
    at least one adhesive, the adhesive connecting the insulating layer to a brake housing shell and connecting the insulating layer to a reinforcing plate located adjacent to the brake housing shell,
    wherein the adhesive layer is present on both sides of the insulating layer.

11. The vibration dampening system of claim 10, wherein the insulating layer is made from a polymeric tape.

12. The vibration dampening system of claim 10, wherein the adhesive is a heavy bodied adhesive caulk or hot melt type material.

13. A method for manufacturing a brake housing having vibration dampening capabilities comprising the steps of:
    providing a housing shell, a reinforcing plate, and a vibration dampening layer, the vibration dampening layer including an insulating layer and at least one adhesive;
    placing the vibration dampening layer between the housing shell and the reinforcing plate;
    providing mounting studs which pass through the housing shell and reinforcing plate to rigidly attach the housing shell to the reinforcing plate; and
    attaching the housing shell to the reinforcing plate for load transfer via the vibration dampening layer.

14. The method of claim 13, wherein the step of attaching results in a permanent attachment between the housing shell and reinforcing plate.

15. The method of claim 13, wherein the load transfer associated with the vibration dampening layer is associated with both tensile and compressive load transfer.

16. The method of claim 13, wherein upon flexing of the housing shell, the vibration dampening layer transfers a portion of the load from the housing shell to the reinforcing plate.

17. The method of claim 13, wherein the adhesive is present on both sides of the insulating layer.

* * * * *